United States Patent

Reinstaedtler et al.

[11] Patent Number: 5,845,163
[45] Date of Patent: Dec. 1, 1998

[54] DEVICE FOR SECURING THE IMAGE POSITION FOR MULTIPLE EXPOSURE OF FILM

[75] Inventors: Uwe Reinstaedtler, Wetzlar; Heinz Fischer, Solms, both of Germany

[73] Assignee: Leica Camera AG, Solms, Germany

[21] Appl. No.: 917,738

[22] Filed: Aug. 27, 1997

[30] Foreign Application Priority Data

Aug. 27, 1996 [DE] Germany ................. 196 34 475.1

[51] Int. Cl.⁶ ..................................... G03B 1/42
[52] U.S. Cl. ............................. 396/391; 396/440
[58] Field of Search ........................ 396/387, 391, 396/395, 401, 411, 413, 439, 440, 535, 322; 242/349, 350

[56] References Cited

U.S. PATENT DOCUMENTS

| | | | |
|---|---|---|---|
| 3,650,191 | 3/1972 | Nomura et al. | 396/391 |
| 3,864,706 | 2/1975 | Urano | 396/391 |
| 3,911,456 | 10/1975 | Umemura | 396/391 |
| 3,968,508 | 7/1976 | Ikeuchi | 396/391 |
| 4,014,035 | 3/1977 | Canfield, Jr. | 396/391 |
| 4,017,875 | 4/1977 | Yamamichi | 396/391 |
| 4,236,799 | 12/1980 | Kobayashi | 396/391 |

*Primary Examiner*—Eddie C. Lee
*Assistant Examiner*—J. K. Han
*Attorney, Agent, or Firm*—Foley & Lardner

[57] ABSTRACT

The present invention provides a multiple exposure image position securing device for a camera having a housing, the device having a slide positioned on the housing, a rewind release button protruding from the housing adjacent the slide, a film transport mechanism located within the housing, a coupler located within the housing and coupled with the film transport mechanism, a lever mechanism extending between the rewind release button and the coupler, a catch lever selectively engaging the coupler, a pawl selectively engaging the film transport mechanism, and a winder positioned on the housing and coupled to the film transport mechanism. The present invention further provides a method of securing a multiple exposure image position in a camera having a disengaging device, having the steps of providing a slide and a rewind release button, actuating the rewind release button with the slide to actuate a coupler and disengage the coupler from a film transport mechanism, and rotating an eccentric spindle with the slide to (1) disengage a catch lever from the coupler and (2) pivot a retaining pawl attached to the eccentric spindle to engage the film transport mechanism to secure the image position.

14 Claims, 4 Drawing Sheets

DEVICE FOR SECURING THE IMAGE POSITION FOR MULTIPLE EXPOSURE OF FILM

FIELD OF THE INVENTION

The present invention relates to a device for securing the image position for multiple exposure of film in a photographic camera.

BACKGROUND OF THE INVENTION

Devices for securing image position are known in which a winding lever actuates a shutter tensioning mechanism and a film transport mechanism. In normal operation, the two mechanisms are coupled together and are driven simultaneously (e.g. when pivoting a manually actuable winding lever) such that the shutter is tensioned and the film is transported by precisely one picture. The film is prevented from rewinding by the coupling of the mechanisms, and therefore remains in the picture position. In some cases, the film transport mechanism is additionally retained in the wound position.

It is furthermore known to separate the two mechanisms from one another to rewind exposed film. For this purpose, a disengagement device is provided, which is triggered by a rewind release button. The rewind release button is recessed in the camera housing. The rewind release button uncouples the two mechanisms from an active position to an uncoupled position. A catch lever engages automatically under spring tension when the two mechanisms are uncoupled, and holds the mechanisms in the uncoupled position. On completion of the rewind operation, the catch lever is released and the two mechanisms are re-coupled.

The rewind release button is also used for multiple exposure of film, wherein the rewind release button is depressed prior to the next winding of the shutter tensioning mechanism. During the winding of the shutter tensioning mechanism, the film is not transported and therefore remains in the previous exposure position. Owing to a slight play which is always present in the film transport mechanism, however, it is impossible to prevent slight vibrations and knocks on the camera housing from causing positional changes of the film. Positional changes of the film before or during the second exposure may cause undesirable image displacements.

Since disengagement of the two mechanisms is canceled by releasing the shutter, for any further exposure of the same point on the film, the rewind release button must be pressed again. Having to press the rewind release button again is bothersome because it requires an additional step, and does not allow multiple exposure of film in cameras having a motorized winder.

The rewind release button is often located on the underside of the camera housing, and therefore is inaccessible or difficult to access when the camera is mounted on a tripod. In order to prevent unintentional disengagement, the rewind release button is recessed from the surface of the camera housing. Additionally, if the camera is set down carelessly or the rewind release button is depressed unintentionally, this state can no longer be canceled due to the automatic engagement of the catch lever. First a shutter release must take place, which usually means that a picture is lost.

The problems identified above are not intended to be exhaustive but rather are among many which tend to reduce the simplicity of achieving multiple exposure of film with a photographic camera. Other problems may also exist. However, those presented above should be sufficient to demonstrate that currently known solutions are amenable to worthwhile improvement.

SUMMARY OF THE INVENTION

It is therefore an object of the present invention to provide multiple exposure of film using a device for the disengagement of the film transport mechanism which can be canceled at any time.

It is a further object of the present invention to provide a device for the disengagement of the film transport mechanism which is easy to operate, is independent of the shutter release, and ensures a secure image position even after movement of the camera housing. In this case, the control elements required for the rewind release button should continue to be used as well.

According to one aspect of the present invention, there is provided a multiple exposure image position securing device for a camera having a housing, the device comprising a slide positioned on the housing, a rewind release button protruding from the housing adjacent the slide, a film transport mechanism located within the housing, a coupler located within the housing and coupled with the film transport mechanism, a lever mechanism extending between the rewind release button and the coupler, a catch lever selectively engaging the coupler, a pawl selectively engaging the film transport mechanism, and a winder positioned on the housing and coupled to the film transport mechanism.

According to another aspect of the present invention, there is provided a method of securing a multiple exposure image position in a camera having a disengaging device, comprising the steps of providing a slide and a rewind release button, actuating the rewind release button with the slide to actuate a coupler and disengage the coupler from a film transport mechanism, and rotating an eccentric spindle with the slide to (1) disengage a catch lever from the coupler and (2) pivot a retaining pawl attached to the eccentric spindle to engage the film transport mechanism to secure the image position.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
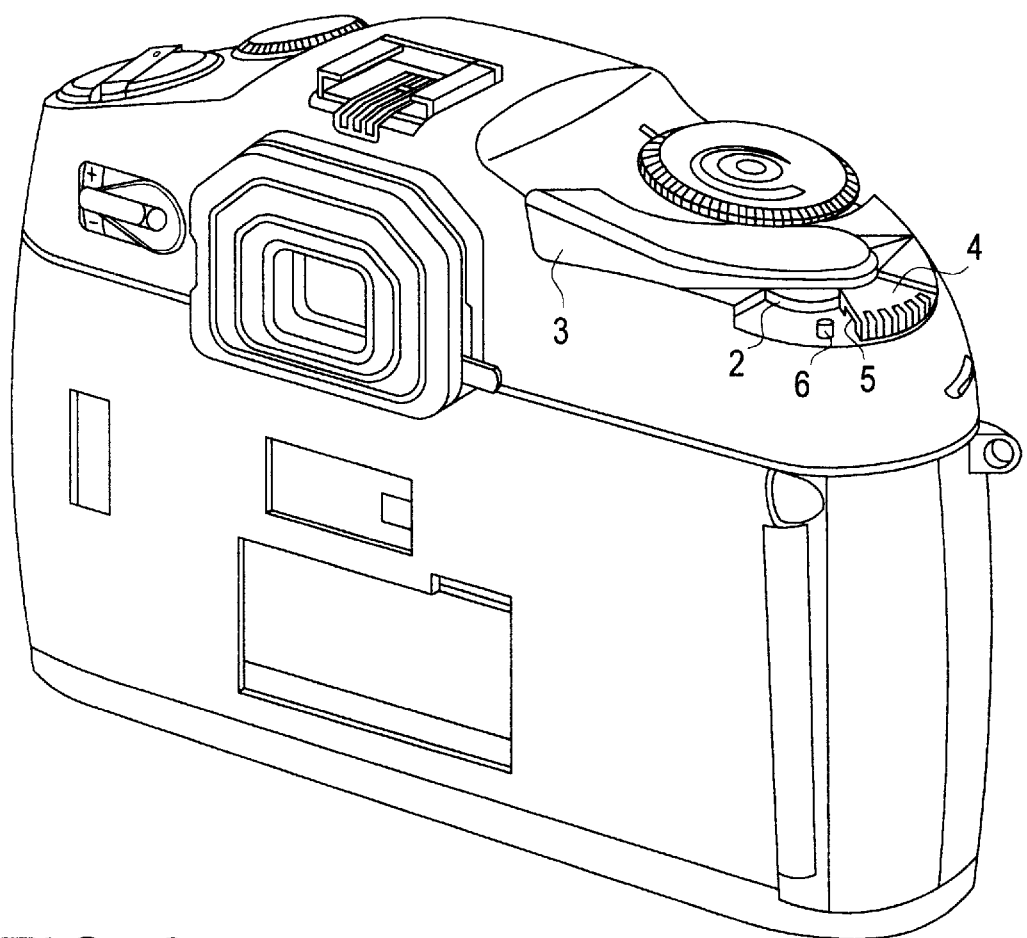
FIG. 1 shows a perspective view of a device according to a preferred embodiment of the present invention.
Figure 2:
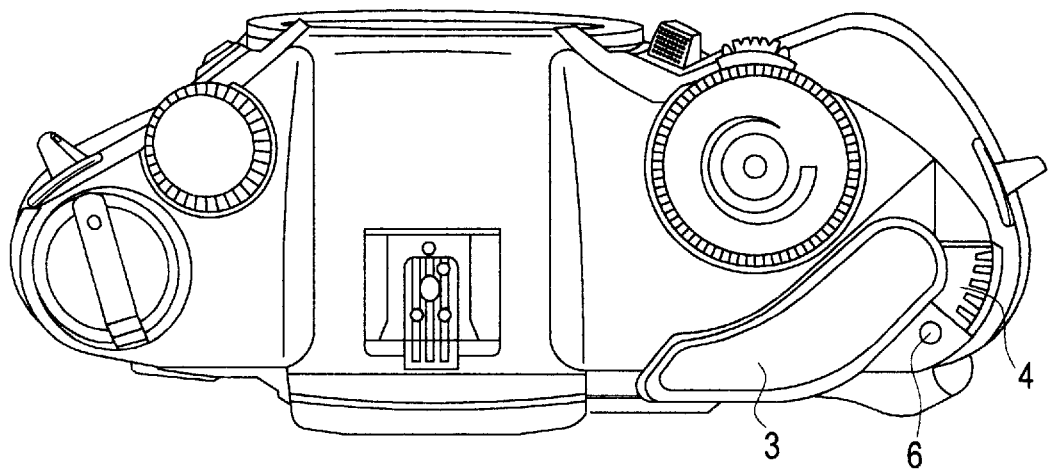
FIG. 2 shows a top view of a device according to a preferred embodiment of the present invention.

In the Figures, like numerals indicate like parts. FIGS. 1 and 2 show perspective and top views of a camera with a multiple exposure device according to the present invention. A winding lever 3 for a shutter tensioning mechanism (not shown) is fitted onto a spindle 2. A slide 4 is rotatably mounted and coaxial with spindle 2. Slide 4 has, in an opening 5, a surface which slopes down to the rear in a wedge shape. Opening 5 of slide 4 fits over a rewind release button 6 when slide 4 is rotated, and the wedge-shaped surface depresses rewind release button 6.

Rewind release button 6 can be depressed once by finger pressure to rewind film. Rewind release button 6 remains locked in the depressed position until the next operation of winding lever 3. Release button can also be depressed by turning slide 4 for a multiple exposure function.

Figure 3:
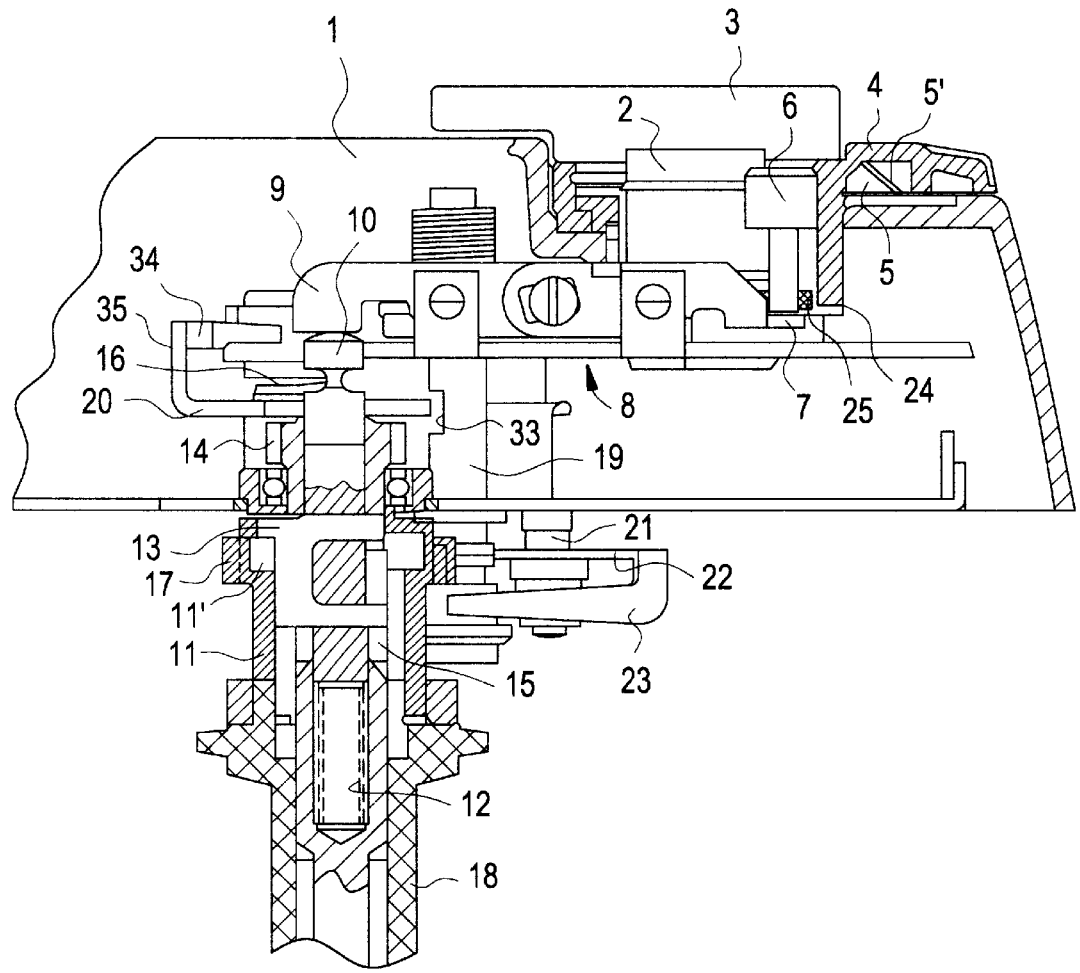
FIG. 3 shows a cross-sectional view of a device according to a preferred embodiment of the present invention.

FIG. 3 shows a cross-sectional view of a device according to a preferred embodiment of the present invention, including a cover 1 of a camera housing. Fitted onto spindle 2 is winding lever 3 for the shutter tensioning mechanism (not shown). Slide 4 is rotatably mounted in cover 1 to be coaxial with spindle 2. Slide 4 has, in opening 5, a surface 5' which slopes down to the rear in a wedge shape.

A rewind release button 6 is displaceably mounted in cover 1. Rewind release button 6 rests on a lever surface 7 which is part of a double rocker 8. At another end of double rocker 8, a lever arm 9 lies on a coupler 10 which is mounted in a gear wheel shaft 14 to be longitudinally displaceable counter to the pressure of a spring 12.

Coupler 10 contains a claw 13 which engages a film transport mechanism 11 and is guided in a longitudinal groove 15 in an inner wall of gear wheel shaft 14. Gear wheel shaft 14 is rotatable within a film transport drum 18, and is connected by gearing to the shutter tensioning mechanism (not shown). An upper part of coupler 10 has a recess 16. Claw 13, in the position shown in FIG. 3, is engaged with film transport mechanism 11 and, via longitudinal groove 15, with gear wheel shaft 14. Therefore, rotation of winding lever 3 produces, through mechanical connection to gear wheel shaft 14, a rotation of film transport drum 18.

When coupling 10 is depressed, claw 13 enters into recess 11' and shifts in longitudinal groove 15 of gear wheel shaft 14. If gear wheel shaft 14 is then rotated when the shutter is wound, claw 13 rotates in recess 11' without carrying film transport wheel 11 and film transport drum 18 with it. The film thus remains still when the winding lever is actuated.

Film transport mechanism 11 contains an outer toothed ring 17 and is in non-positive engagement with film transporting drum 18. Since rewinding is performed by pulling on the wound-up film, and this is also possible in the multiple exposure mode, outer toothed ring 17 can become damaged. For safety, a pawl 22 is resiliently mounted to engage outer toothed ring 17.

Figure 4:
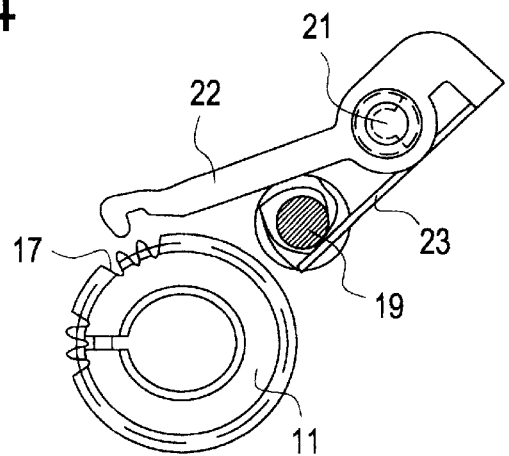
FIG. 4 illustrates a film transport mechanism, and a securing mechanism therefor according to a preferred embodiment of the present invention.

Inside cover 1, an eccentric spindle 19 is rotatably mounted. A catch lever 20 is guided and is pivotable under spring tension, supplied by coil spring 32, toward eccentric spindle 19. Pawl 22 is pivotably mounted on a spindle 21. A leaf spring 23 of pawl 22 extends beyond spindle 21. As can be seen in FIG. 4, pawl 22 and leaf spring 23 rest simultaneously against different control surfaces of eccentric spindle 19.

To rewind film, rewind release button 6 is pressed into cover 1. Rewind release button 6 presses lever surface 7 downward and a connecting joint of double rocker 8 actuates lever arm 9 such that lever arm 9 presses coupler 10 into gear wheel shaft 14 counter to pressure exerted by spring 12. Upon lever arm 9 pressing coupler 10, claw 13 of coupler 10 is released from engagement with film transport mechanism 11 (into recess 11') and therefore separates film transport mechanism 11 from the shutter tensioning mechanism (not shown). During disengagement of film transport mechanism 11 with the shutter tensioning mechanism (not shown), recess 16 of coupler 10 is located opposite to catch lever 20. Therefore, catch lever 20 is biased, by a spring force from coil spring 32, into recess 16 to maintain disengagement of film transport mechanism 11 with the shutter tensioning mechanism during rewinding by maintaining the position of coupler 10 (counter to a pressure exerted by spring 12).

To create multiple exposure, slide 4 is rotated about spindle 2, and opening 5 of slide 4 slides over rewind release button 6 such that the wedge-shaped surface 5' of slide 4 presses rewind release button 6 into cover 1. Rewind release button 6 presses lever surface 7 downward and a connecting joint of double rocker 8 actuates lever arm 9 such that lever arm 9 presses coupler 10 into gear wheel shaft 14 counter to pressure exerted by spring 12. Upon lever arm 9 pressing coupler 10, claw 13 of coupler 10 is released from engagement with film transport mechanism 11 and therefore separates film transport mechanism 11 from the shutter tensioning mechanism (not shown). During disengagement of film transport mechanism 11 from the shutter tensioning mechanism (not shown), recess 16 of coupler 10 is located opposite to catch lever 20. Therefore, catch lever 20 springs into recess 16 and maintains disengagement of film transport mechanism 11 with the shutter tensioning mechanism.

Figure 5:
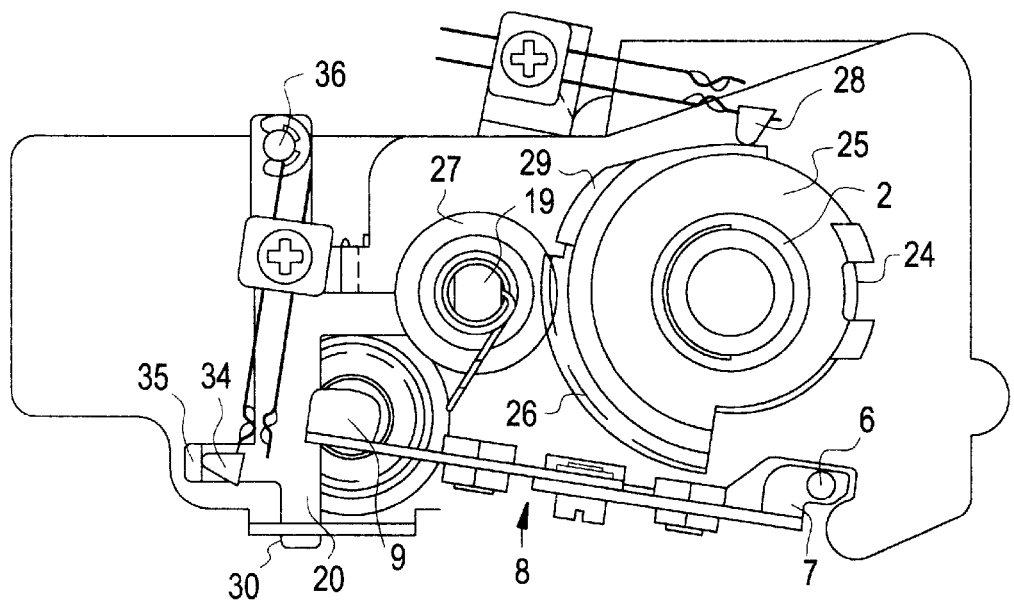
FIG. 5 illustrates a portion of the device extending between a slide and an eccentric spindle according to a preferred embodiment of the present invention.

As can be seen in FIG. 5, eccentric spindle 19 is also driven by slide 4. To drive eccentric spindle 19, slide 4 engages a groove 24 of a cam disk 25 which has teeth 26 over part of its circumference and is engaged with a toothed ring 27 which is fitted onto eccentric spindle 19. Teeth 26 and toothed ring 27 form a gear mechanism. Rotation of slide 4 to depress rewind release button 6 simultaneously rotates cam disk 25 which, by virtue of the gearing 26 and 27, rotates eccentric spindle 19.

An electric switch 28 lies on cam disk 25. The transmission ratio of the gear mechanism is such that, with a rotation of cam disk 25 through about 60°, eccentric spindle 19 is rotated by about 180°. During rotation of cam disk 25, cam part 29 on cam disk 25 closes switch 28. A switching pulse generated by closing switch 28 is preferably used for electrical display of a multiple exposure mode to the operator of the camera. The switching pulse may also be used for blocking a motorized rewind drive in order to prevent damage to toothed ring 17 by the engagement of pawl 22.

When rewind release button 6 is depressed by slide 4, rewinding is also possible. Rewinding is prevented only by engagement of pawl 22 with toothed ring 17.

Figure 6:
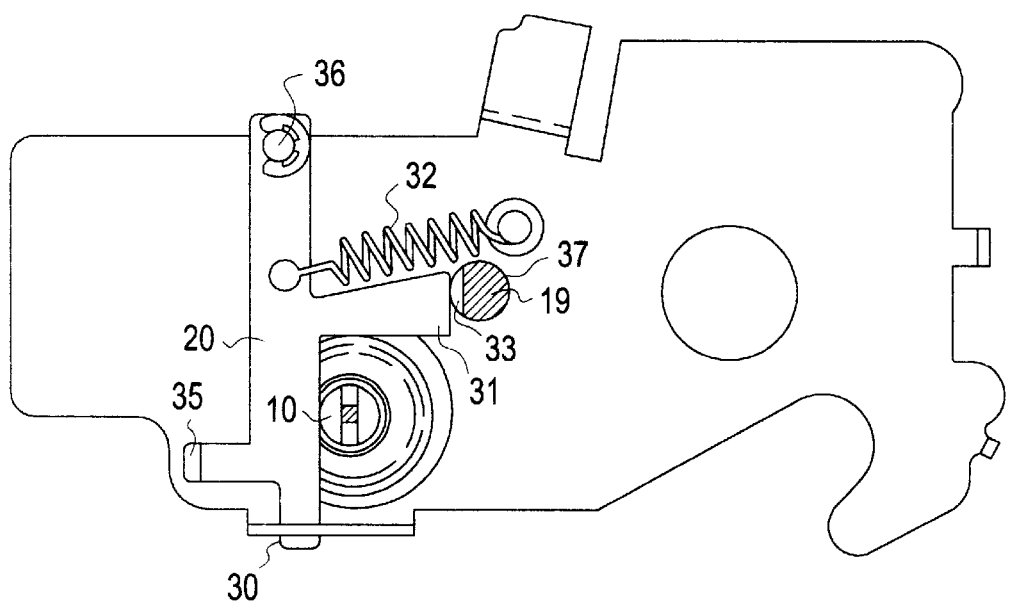
FIG. 6 illustrates components of the device according to a preferred embodiment of the present invention.

As can be seen in FIG. 6, catch lever 20 is pivotably mounted about an axis 36 and is guided in a slot 30. A supporting foot 31 extends from catch lever 20, toward eccentric spindle 19. When lever arm 9 presses coupler 10, catch lever 20 is urged by spring 32 to engage recess 16 and maintain disengagement of film transport mechanism 11 with the shutter tensioning mechanism during rewinding. In order for catch lever 20 to engage recess 16, supporting foot 31 must engage a circumference 37 of eccentric spindle 19 and therefore holds catch lever 20 outside recess 16. At the same time, a control surface for pawl 22 is turned by rotation of eccentric spindle 19 such that pawl 22 engages toothed ring 17 of film transport mechanism 11.

An electric switch 34 rests against a lug 35 on catch lever 20. Electric switch 34 is triggered when catch lever 20 has engaged recess 16 to maintain disengagement of film transport mechanism 11 with the shutter tensioning mechanism during rewinding. The signal emitted by switch 34 can be used to indicate a rewind function is turned on, or an automatic rewind can be started.

The rewind release button is arranged to protrude from the camera housing. The rewind release button can be pressed into the camera housing in the usual manner. The catch lever engages the coupler after the coupler is disengaged from the film transport mechanism. Rewinding can then be carried out. The catch lever can be released by the shutter release.

Figure 7:
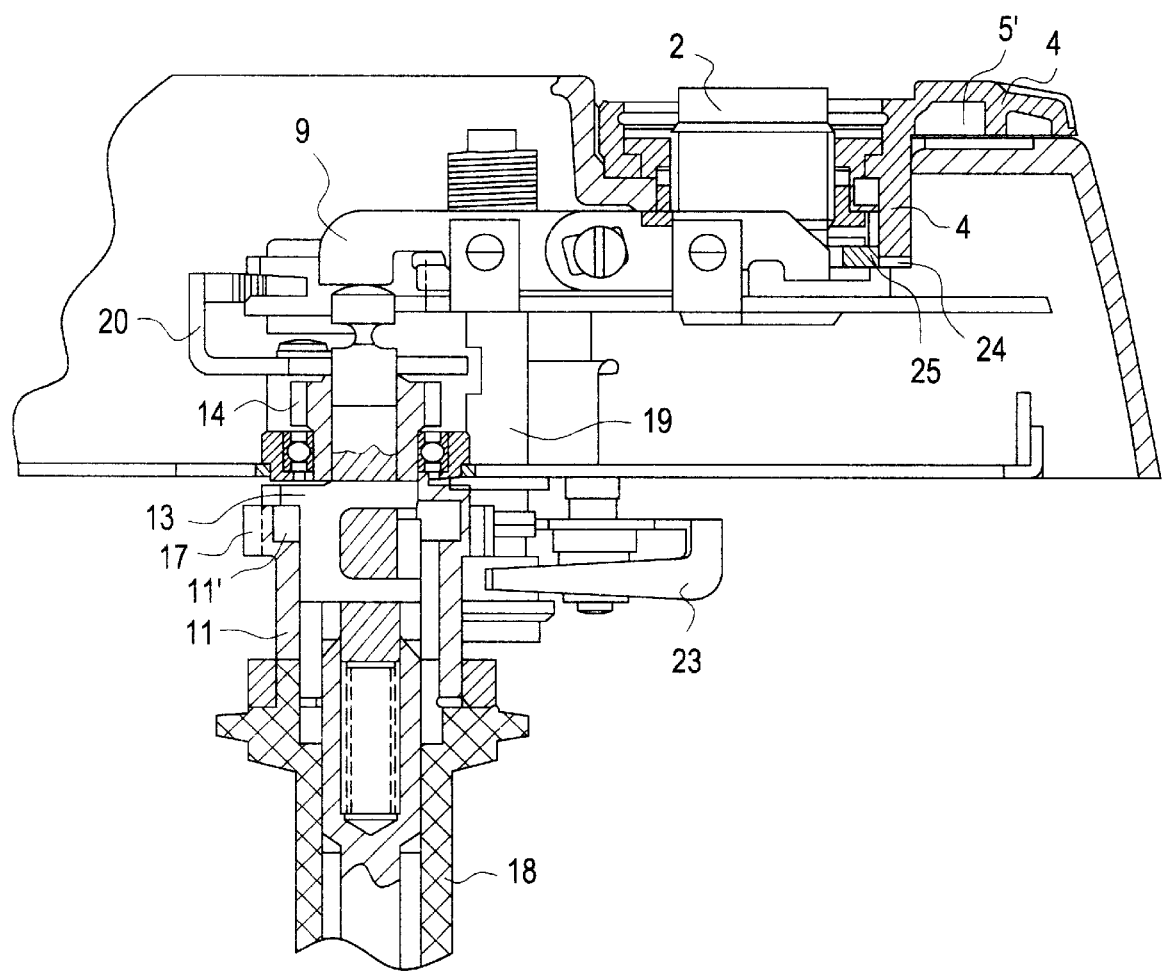
FIG. 7 shows a cross-sectional view of a device according to a preferred embodiment of the present invention.

FIG. 7 shows a cross-sectional view similar to that shown in FIG. 3, but with rewind release button 6 removed to show slide 4 engaging groove 24 of cam disk 25 so that slide 4 can actuate eccentric spindle 19.

Additionally, the slide has a surface which rises in a wedge shape and with which the rewind release button can be pressed into the camera housing. The slide is coupled to the eccentric spindle such that the eccentric spindle is turned by movement of the slide. The catch lever rests under spring tension against the eccentric spindle such that, upon rotating the slide, the catch lever disengages from the coupler.

The pawl rests against the eccentric spindle and, when the rewind release button is pressed in completely, engages the teeth of the toothed ring mounted on the film transport mechanism, and in this way ensures a secure image position. In a preferred embodiment, the pawl is designed as a two-armed lever whose one arm forms a spring which rests against the eccentric spindle, allowing the pawl to spring out of the teeth when the film transport mechanism is turned forcefully (e.g. by means of the rewind lever). This avoids damage to the film if the film transport mechanism 11 is not properly disengaged from the shutter tensioning mechanism during rewinding.

Disengagement of the film transport mechanism from the gear wheel shaft takes place solely by means of the rewind release button, which is held depressed by the slide. While the rewind release button is held depressed by the slide, any desired number of shutter releases are possible without interruption. Operation using a motorized winder is ensured without restriction.

Coupler of the device for disengagement of the film transport mechanism is advantageously subject to spring pressure against the double rocker. When the slide is pushed out of the multiple exposure position, the rewind release button slides out of the camera housing under spring pressure. The eccentric spindle is preferably designed to interact with the catch lever and the pawl such that the catch lever is held at a distance from the coupler (e.g., does not engage the recess of the coupler) until the coupler has been restored by spring force to an unactuated position, and the pawl disengages from the toothed ring on the film transport mechanism before the coupling between the gear wheel shaft and the film transport mechanism has been reinstated.

It is clear that unintentional pressing of the rewind release button and engagement of the catch lever with the coupler can be canceled by moving the slide back and forth between a multiple exposure position and a single exposure position via the associated function of the eccentric spindle. There is no need for a second shutter release and thus possible loss of a picture.

In a preferred embodiment, the rewind release button is advantageously arranged near the manually actuable winding lever, and the slide is mounted coaxially with the spindle of the winding lever. The slide can then be actuated with the same finger which is used to actuate the shutter release button. The shutter release button usually lies on the spindle of the shutter winder. The coupling between the slide and the eccentric spindle takes place by the gear mechanism so that, with a rotation of the slide through about 60° a rotation of the eccentric spindle by, for example, 180° can be achieved. This allows the desired interaction of the eccentric spindle, the catch lever and the pawl.

The electric switch which triggers the signal for the function position can be assigned both to the catch lever and the pawl. Moreover, the slide may be provided with a window which clearly displays the position of the multiple exposure.

Other embodiments of the device will be apparent to those skilled in the art from consideration of the specification disclosed herein. It is intended that the specification be considered as exemplary only, with the true scope and spirit of the invention being indicated by the following claims.

German application number 196 34 475.1 is incorporated herein by reference in its entirety.

What is claimed is:

1. A multiple exposure image position securing device for a camera having a housing, the device comprising:

a slide positioned on the housing;

a rewind release button protruding from the housing adjacent the slide;

a film transport mechanism located within the housing;

a coupler located within the housing and coupled with the film transport mechanism;

a lever mechanism extending between the rewind release button and the coupler;

a catch lever selectively engaging the coupler;

a pawl selectively engaging the film transport mechanism; and a winder positioned on the housing and coupled to the film transport mechanism, wherein the slide is movable to actuate the rewind release button.

2. A device as claimed in claim 1, further comprising a resilient member biasing the rewind release button.

3. A device as claimed in claim 1, further comprising a resilient member biasing the coupler.

4. A device as claimed in claim 3, wherein the lever mechanism comprises a double rocker.

5. A device as claimed in claim 1, further comprising an eccentric spindle actuated by the slide, and wherein the catch lever and the pawl abut the eccentric spindle.

6. A device as claimed in claim 5, wherein the eccentric spindle includes an outer perimeter and a cut-out portion, and wherein the catch lever selectively engages one of the outer perimeter and the cut-out portion.

7. A device as claimed in claim 1, wherein an electric switch is connected to the catch lever.

8. A device as claimed in claim 1, wherein an electric switch is connected to the slide.

9. A device as claimed in claim 1, wherein the pawl comprises two arms, and one of the two arms is a resilient arm.

10. A device as claimed in claim 9, wherein the resilient arm biases the pawl to disengage from the film transport mechanism.

11. A device as claimed in claim 1, wherein the rewind release button is arranged near the winder, and the slide is rotatably mounted to a spindle of the winder.

12. A device as claimed in claim 1, wherein the slide has a wedge-shaped surface which presses the rewind release button into the housing.

13. A device as claimed in claim 1, wherein the slide and the eccentric spindle are coupled together by a gear mechanism.

14. A method of securing a multiple exposure image position in a camera having a disengaging device, comprising the steps of:

provding a slide and a rewind release button;

actuating the rewind release button with the slide to disengage a coupler from a film transport mechanism; and rotating an eccentric spindle with the slide to (1) disengage a catch lever from the coupler and (2) pivot a retaining pawl attached to the eccentric spindle to engage the film transport mechanism and secure the image position.

* * * * *